(12) United States Patent
Foitzik et al.

(10) Patent No.: US 9,676,379 B2
(45) Date of Patent: Jun. 13, 2017

(54) METHOD FOR OPERATING AN ELECTROMECHANICAL BRAKE BOOSTER, RECUPERATIVE BRAKING SYSTEM, AND CONTROL DEVICE FOR AN ELECTROMECHANICAL BRAKE BOOSTER OF A BRAKING SYSTEM

(71) Applicant: Robert Bosch GmbH, Stuttgart (DE)

(72) Inventors: Bertram Foitzik, Ilsfeld (DE); Benno Schmieg, Heilbronn (DE); Benoit Herve, Versailles (FR)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/914,715

(22) PCT Filed: Aug. 6, 2014

(86) PCT No.: PCT/EP2014/066908
§ 371 (c)(1),
(2) Date: Feb. 26, 2016

(87) PCT Pub. No.: WO2015/032570
PCT Pub. Date: Mar. 12, 2015

(65) Prior Publication Data
US 2016/0207515 A1    Jul. 21, 2016

(30) Foreign Application Priority Data
Sep. 4, 2013    (DE) .......................... 10 2013 217 579

(51) Int. Cl.
*B60T 13/74* (2006.01)
*B60T 8/172* (2006.01)

(52) U.S. Cl.
CPC ............ *B60T 13/745* (2013.01); *B60T 8/172* (2013.01)

(58) Field of Classification Search
CPC ............................... B60T 13/745; B60T 8/172
(Continued)

(56) References Cited

U.S. PATENT DOCUMENTS 5,505,526 A    4/1996 Michels
6,019,440 A    2/2000 Scherer et al.
(Continued)

FOREIGN PATENT DOCUMENTS

EP    1081005    3/2001
EP    2631128    8/2013
(Continued)

OTHER PUBLICATIONS

International Search Report for PCT/EP2014/066908, issued Feb. 6, 2015.

*Primary Examiner* — Tyler J Lee
(74) *Attorney, Agent, or Firm* — Gerard Messina (57) ABSTRACT

A method for operating an electromechanical brake booster of a braking system including: establishing a virtual setpoint brake pressure variable; and establishing a setpoint differential travel variable with respect to a setpoint differential travel at least by: establishing a first intermediate value while taking into consideration a first weighting relation and a minimum from a first value set including the virtual setpoint brake pressure variable and a jump-in pressure variable; and establishing a second intermediate value while taking into consideration a second weighting relation and a maximum from a second value set including zero and a value of a difference using the virtual setpoint brake pressure variable as the minuend and the jump-in pressure variable as the subtrahend. A method for operating a recuperative braking system is also provided.

12 Claims, 4 Drawing Sheets

(58) Field of Classification Search
USPC .......................................................... 701/70
See application file for complete search history.

(56) References Cited

U.S. PATENT DOCUMENTS

| | | | |
|---|---|---|---|
| 6,318,815 B1* | 11/2001 | Haupt | B60T 8/3275 |
| | | | 188/358 |
| 2014/0032071 A1* | 1/2014 | Strengert | B60L 3/0023 |
| | | | 701/70 |
| 2015/0283987 A1* | 10/2015 | Bareiss | B60T 13/662 |
| | | | 701/70 |
| 2016/0009258 A1* | 1/2016 | Betz | B60T 13/66 |
| | | | 701/70 |

FOREIGN PATENT DOCUMENTS

| | | |
|---|---|---|
| EP | 2 703 238 A1 | 3/2014 |
| FR | 2947228 | 12/2010 |
| FR | 2 989 658 A1 | 10/2013 |
| KR | 20130070550 A | 6/2013 |

\* cited by examiner

METHOD FOR OPERATING AN ELECTROMECHANICAL BRAKE BOOSTER, RECUPERATIVE BRAKING SYSTEM, AND CONTROL DEVICE FOR AN ELECTROMECHANICAL BRAKE BOOSTER OF A BRAKING SYSTEM

FIELD

The present invention relates to a method for operating an electromechanical brake booster of a braking system and a method for operating a recuperative braking system. The present invention also relates to a control device for at least one electromechanical brake booster of a braking system.

Furthermore, the present invention relates to an electromechanical brake booster and a braking system for a vehicle.

BACKGROUND INFORMATION

A braking system including an electromechanical brake booster is described in French Patent No. 2 947 228 A1. The electromechanical brake booster includes a boost housing, which is displaceable with the aid of an electric motor, and which has a continuous receiving opening for a valve body, which is situated displaceably therein and is co-displaceable with the boost housing. In addition, the valve body has a continuous central opening, within which a valve piston is displaceable in relation to the valve body with the aid of a driver brake force transmitted thereon. To transmit the driver brake force to the valve piston, an input rod may at least intermittently contact the valve piston. In addition, an output piston is displaceable with the aid of the displacement movements of the valve body and/or the valve piston in such a way that a brake pressure which is present in at least one compression chamber of a brake master cylinder may be increased.

SUMMARY

The present invention provides a method for operating an electromechanical brake booster of a braking system, a method for operating a recuperative braking system including an electromechanical brake booster, a control device for at least one electromechanical brake booster of a braking system, an electromechanical brake booster for a braking system, and a braking system for a vehicle.

The present invention provides multiple options for ensuring an advantageous (standard) brake actuating feeling (pedal feeling) for a driver during deceleration/stopping of his/her vehicle. As explained in greater detail hereafter, the present invention is advantageously usable in particular on a recuperative braking system. In the case of such a use of the present invention, in spite of an increase/reduction of a brake master cylinder pressure existing in a brake master cylinder of the recuperative braking system, it is ensured that the driver has an advantageous (standard) brake actuating feeling (pedal feeling) independently of the occurring variations of the brake master cylinder pressure. In particular, a desired restoring force of the brake actuation element of the recuperative braking system, for example, a brake pedal, is settable with the aid of the present invention independently of the brake master cylinder pressure. Therefore, with the aid of a variation of the brake master cylinder pressure, at least one generator braking torque of at least one generator may be overlaid, without this resulting in an unfamiliar brake actuating feeling (pedal feeling) for the driver. It is advantageously ensured above all that the position of the jump-in point, which is perceptible to the driver, does not change. During a brake application with overlay of the generator braking torque, the force feedback, which is perceptible to the driver, on the brake actuation element does not differ from the standard perceptible force feedback during a brake application carried out exclusively by the friction braking torques of the wheel brake cylinders of the recuperative braking system.

The advantages of the present invention are explained on the basis of the example of a recuperative braking system in the preceding paragraph. However, it is to be noted that the usability of the present invention does not presume the usage of a braking system designed for recuperative braking.

The present invention makes it possible to establish the setpoint differential travel variable with respect to the setpoint differential travel between the valve piston and the valve body of the electromechanical brake booster or with respect to a position of a boost body of the electromechanical brake booster, separate components being used as a first intermediate value and as a second intermediate value as a function of the particular set/existing operating point of the electromechanical brake booster. As explained in greater detail hereafter, establishing the first intermediate value ensures that a gap between the valve piston and a reaction disk of the electromechanical brake booster is closed precisely at a desired jump-in pressure. Above all, in this way a free ability to set/apply the jump-in pressure (jump-in value) may be achieved within given physical limits, for example, a deformation travel of the reaction disk and the mechanical stops. In contrast, establishing the second intermediate value ensures minimization of the force variations on the brake actuation element (brake pedal) with volumetric overlay, which is described in greater detail hereafter, of the at least one generator braking torque.

The establishment of the setpoint differential travel variable is preferably carried out while additionally taking into consideration a quotient of a brake master cylinder pressure variable, with respect to a brake master cylinder pressure, which is present or is to be set in a brake master cylinder of the braking system, as the dividend and the virtual setpoint brake pressure variable as the divisor. However, the brake master cylinder pressure variable may also be, for example, a brake master cylinder pressure, which is measured in the brake master cylinder, or a variable derived therefrom. The brake master cylinder pressure variable may also, however, correspond to a desired brake master cylinder pressure, which is to be set, for example, to overlay a chronologically varying generator braking torque in the brake master cylinder of the braking system. Therefore, the force level in the brake master cylinder may also be taken into consideration when establishing the setpoint differential travel variable. The computing step described here for forming the quotient as a function of an operating point of the electromechanical brake booster, which corresponds to the driver braking intent and a pressure (actual pressure) set in the brake master cylinder or the driver braking intent and a pressure (setpoint pressure) to be set in the brake master cylinder, ensures a particularly advantageous usability of the electromechanical brake booster.

To establish the setpoint differential travel variable, a third intermediate value is preferably established and also taken into consideration as a product of the sum of the first intermediate value and the second intermediate value and the quotient of the brake master cylinder pressure variable as the dividend and the virtual setpoint brake pressure variable as the divisor. This provides an establishment of the setpoint differential travel variable while also taking into consideration a gradient. In addition, the setpoint differential travel variable may be established while taking into consideration a value of a difference using the sum of the first intermediate value and the second intermediate value as the minuend and the third intermediate value as the subtrahend.

Low-pass filtering may optionally be carried out to establish the setpoint differential travel variable. Alternatively or additionally thereto, gradient limiting may be carried out to establish the setpoint differential travel variable. Manipulated variable limiting may also be carried out to establish the setpoint differential travel variable. All procedures described here may optionally be used to ensure a more advantageous establishment of the setpoint differential travel variable.

The above-described advantages are also ensured when carrying out a corresponding method for operating a recuperative braking system including an electromechanical brake booster. For this purpose, at least the following steps are carried out during the actuation of the brake actuation element of the recuperative braking system: establishing a generator braking torque, which is carried out with the aid of a generator of the recuperative braking system, at least while taking into consideration the actuation travel and/or the actuation strength of the actuation of the brake actuation element and controlling the generator accordingly, varying at least one friction braking torque of at least one wheel brake cylinder of the recuperative braking system at least while taking into consideration the established generator braking torque by establishing a setpoint variable with respect to a fluid volume, which is to be displaced with the aid of at least one hydraulic unit of the recuperative braking system between at least one storage volume and a storage-external volume of at least one brake circuit of the recuperative braking system at least while taking into consideration the established generator braking torque and controlling the at least one hydraulic unit accordingly; and varying a restoring force of the brake actuation element by operating the electromechanical brake booster. The method for operating the recuperative braking system may be refined in accordance with the above statements on the method for operating the electromechanical brake booster.

In addition, the described advantages are implemented by a corresponding control device for at least one electromechanical brake booster of a braking system. The control device is designed to establish a virtual setpoint brake pressure variable at least while taking into consideration an actuation travel and/or an actuation strength of an actuation of a brake actuation element of the braking system, the control device additionally being designed to establish a setpoint differential travel variable with respect to a setpoint differential travel to be set between a valve piston and a valve body of the electromechanical brake booster, at least in that a first intermediate value may be established while taking into consideration a first weighting relation and a minimum of a first value set including the virtual setpoint brake pressure variable and a jump-in pressure variable, which corresponds to a virtual setpoint brake pressure variable, from which a gap, which exists when the brake actuation element is not actuated, is closed, and in that a second intermediate value may be established while taking into consideration a second weighting relation and a maximum of a second value set including zero and a value of a difference having the virtual setpoint brake pressure variable as the minuend and the jump-in pressure variable as the subtrahend, the setpoint differential travel variable being able to be established at least under consideration of a sum of the first intermediate value and the second intermediate value, and the control device being designed to control a motor of the electromechanical brake booster in such a way that a differential travel, which corresponds to the established setpoint differential travel variable, is settable between the valve piston and the valve body of the electromechanical brake booster. The control device may also be refined according to the above-described specific embodiments of the method for operating the electromechanical brake booster.

In one advantageous refinement, the control device is additionally designed to establish a generator braking torque, which is carried out with the aid of a generator of the braking system, at least while taking into consideration the actuation travel and/or the actuation strength of the actuation of the brake actuation element and to control the generator accordingly, and, at least while taking into consideration the established generator braking torque, to establish a setpoint variable with respect to a brake fluid volume, which is to be displaced with the aid of at least one hydraulic unit of the braking system between at least one storage volume and a storage-external volume of at least one brake circuit of the braking system and to control the at least one hydraulic unit accordingly. The control device may also therefore implement the advantages of the method for operating a recuperative braking system.

An electromechanical brake booster for a braking system including such a control device and a braking system for a vehicle having a corresponding control device and/or a corresponding electromechanical brake booster may also contribute to implementing the above-described advantages. The electromechanical brake booster and the braking system may be refined in accordance with the above-described specific embodiments.

BRIEF DESCRIPTION OF THE DRAWINGS

Further features and advantages of the present invention are explained hereafter on the basis of the figures.

DETAILED DESCRIPTION OF EXAMPLE EMBODIMENTS

Figure 1:
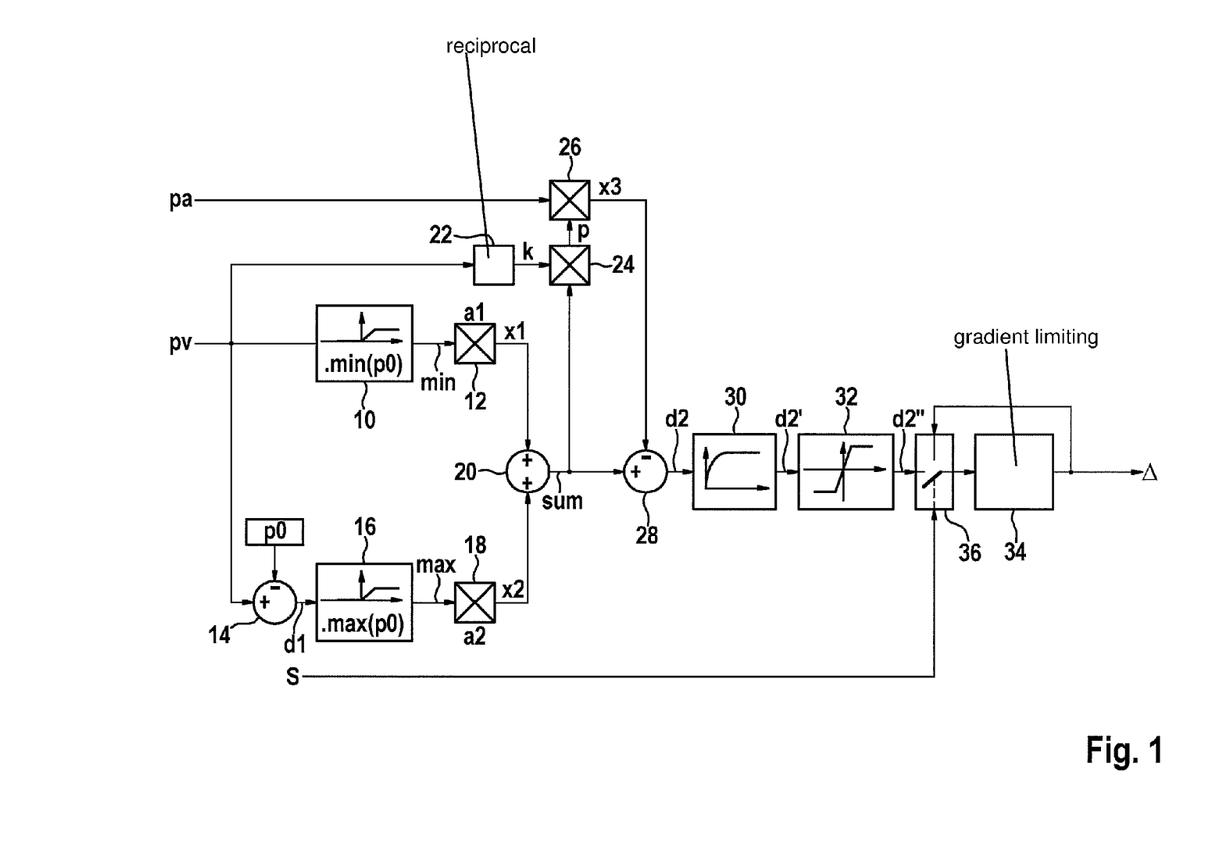
FIG. 1 shows a block diagram to explain one specific embodiment of the method for operating an electromechanical brake booster of a braking system.

FIG. 1 shows a block diagram to explain one specific embodiment of the method for operating an electromechanical brake booster of a braking system.

The method which is schematically shown in FIG. 1 may be used for operating a variety of different types of electromechanical brake boosters. For example, all electromechanical brake boosters which may be controlled or regulated are operable using the method shown in FIG. 1. In particular, the above-described conventional electromechanical brake booster may be operated with the aid of the method shown in FIG. 1. However, it is to be noted that the ability to carry out the method is not limited to this brake booster type.

In one method step (not shown in greater detail), a virtual setpoint brake pressure variable pv is established at least while taking into consideration an actuation travel and/or an actuation strength of an actuation of a brake actuation element of the braking system. Virtual setpoint brake pressure variable pv is preferably established in such a way that it corresponds to a (setpoint) brake pressure, which is provided/would be provided in the event of purely-hydraulic braking of the braking system in accordance with the driver braking intent indicated by the actuation of the brake actuation element. The (setpoint) brake pressure may be established in particular as virtual setpoint brake pressure variable pv. Instead of a pressure variable, virtual setpoint brake pressure variable pv may also be another variable corresponding to the (setpoint) brake pressure, however.

For example, a pedal travel, a rod travel, a driver brake force, and/or a driver brake pressure may be analyzed to establish virtual setpoint brake pressure variable pv. The examples listed here for the actuation travel or the actuation strength are not restrictive, however. The ability to carry out the method is also not limited to a braking system having a brake pedal as the brake actuation element.

A setpoint differential travel variable $\Delta$ with respect to a setpoint differential travel to be set between a valve piston and a valve body or a boost body of the electromechanical brake booster is established at least while taking into consideration established virtual setpoint brake pressure variable pv. In particular the setpoint differential travel to be set may be established as setpoint differential travel variable $\Delta$. The valve piston is preferably to be understood as a component displaceably situated in a central opening of the valve body, via which a driver brake force is transmittable from the brake actuation element to at least one displaceable piston of a brake master cylinder of the braking system.

The establishment of setpoint differential travel variable $\Delta$, while at least taking into consideration established virtual setpoint brake pressure variable pv, is carried out by establishing a first intermediate value x1 while taking into consideration a first weighting relation a1 and a minimum min from a first value set. The first value set includes virtual setpoint brake pressure variable pv and a jump-in pressure variable p0. Jump-in pressure variable p0 is to be understood as a variable which corresponds to a virtual setpoint brake pressure variable pv, from which a gap, which is present when the brake actuation element is not actuated, is closed. There is frequently a gap between a reaction disk of the electromechanical brake booster and the valve piston when the brake actuation element is not actuated. Jump-in pressure variable p0 may therefore correspond to a setpoint brake pressure, which is present in the case of solely-hydraulic braking at the point in time from which the actuation of the brake actuation element causes closing of the gap, while transmission of the driver brake force to the at least one displaceable piston of the brake master cylinder is previously prevented as a result of the non-closed gap/the open gap. Jump-in pressure variable p0 may be a pressure value or a corresponding variable. Jump-in pressure variable p0 generally corresponds to the jump-in range of the electromechanical brake booster and is also frequently described as the jump-in point or as the (desired) jump-in pressure limiting value. Jump-in pressure variable p0 may optionally be specified by the mechanism of the electromechanical brake booster or set via programming of its electronics.

The method step described in the preceding paragraph ensures that the gap (for example, between the reaction disk and the valve piston) is closed precisely at a desired jump-in point/jump-in pressure limiting value. As explained in greater detail hereafter, it is therefore still ensured, even during an overlay of at least one generator braking torque by a volume displacement within the hydraulics of the braking system that, in particular at the jump-in point, no deviating restoring behavior/brake actuating feeling of the brake actuation element occurs.

In the specific embodiment of FIG. 1, virtual setpoint brake pressure variable pv is supplied to a block 10, by which minimum min is established from the first value set. (Jump-in pressure variable p0 may be stored, for example, on a storage unit (not shown)). Subsequently, minimum min is supplied to a block 12, in which first intermediate value x1 is calculated as a product of minimum min and first weighting relation a1.

In addition, a second intermediate value x2 is established while taking into consideration a second weighting relation a2 and a maximum max from a second value set. The second value set includes number 0 and a value of a difference d1. Difference d1 is calculated in a block 14 using virtual setpoint brake pressure variable pv as the minuend and jump-in pressure variable p0 as the subtrahend. Difference d1 is supplied to a block 16, which establishes maximum max from the second value set. Subsequently, in a block 18, a product is calculated from maximum max and second weighting relation a2 as second intermediate value x2. It is possible with the aid of second intermediate value x2 to adapt a force curve of a restoring force of the actuated brake actuation element to a desired characteristic curve after closing of the gap.

First weighting relation a1 and/or second weighting relation a2 may either each be a weighting factor, may each be at least two factors, or may be a characteristic curve. First weighting factor a1 preferably corresponds to a quotient of a gap, which is actually structurally present in the non-actuated state of the electromechanical brake booster, and a desired jump-in pressure limiting value.

The method of FIG. 1 therefore implements an at least two-factor force compensation. A multi-factor pedal force compensation may also be carried out in addition to the two-factor pedal force compensation. It is identified by blocks 10 and 16 whether virtual setpoint brake pressure variable pv is less than or greater than jump-in pressure variable p0 (to be set/specified). First intermediate value x1 ensures the closing of the gap precisely at the specified jump-in point/jump-in pressure limiting value. Second intermediate value x2 is able to ensure a minimization of variations at the brake actuation element/brake pedal. The advantages of a single-factor pedal force compensation are therefore also still ensured when carrying out the method of FIG. 1.

Setpoint differential travel variable $\Delta$ is established at least while taking into consideration a sum sum of first intermediate value x1 and second intermediate value x2. For this purpose, intermediate values x1 and x2 may be supplied to a block 20 for summation. This may also be described as an addition of offset setpoint values for a desired position of the valve body/boost body.

Setpoint differential travel variable $\Delta$ is advantageously additionally established while taking into consideration a (present) brake master cylinder pressure variable pa with respect to a brake master cylinder pressure which is present or is to be set in the brake master cylinder of the braking system. Brake master cylinder pressure variable pa may therefore either be a variable with respect to an actual pressure in the brake master cylinder or with respect to a desired setpoint pressure in the brake master cylinder. Such a pressure value or a corresponding variable may be used in particular as brake master cylinder pressure variable pa. Setpoint differential travel variable $\Delta$ is preferably established while additionally taking into consideration a quotient which is derived using brake master cylinder pressure variable pa as the dividend and virtual setpoint brake pressure variable pv as the divisor.

To ensure this, in the method of FIG. 1 for establishing setpoint differential travel variable Δ, a third intermediate value x3 is calculated. Third intermediate value x3 is a product of sum sum (from first intermediate value x1 and second intermediate value x2) and the quotient (using brake master cylinder pressure variable pa as the dividend and virtual setpoint brake pressure variable pv as the divisor). Third intermediate value x3 is also taken into consideration when establishing setpoint differential travel variable Δ. To derive third intermediate value x3, a reciprocal value k of virtual setpoint brake pressure variable pv is determined in a block 22. Reciprocal value k is multiplied with sum sum with the aid of a block 24. Product p calculated in this way is supplied, together with brake master cylinder pressure variable pa, to a block 26, which calculates third intermediate value x3 by multiplying product p with brake master cylinder pressure variable pa.

Establishing third intermediate value x3 enables a brake master cylinder force level to be taken into consideration (as a function of the operating point of the electromechanical brake booster and/or as a function of sum sum) when establishing setpoint differential travel variable Δ, in that a gradient is determined for the consideration of the actual pressure or the setpoint pressure.

In the method of FIG. 1, setpoint differential travel variable Δ is established while taking into consideration a value of a difference d2 with sum sum (from first intermediate value x1 and second intermediate value x2) as the minuend and third intermediate value x3 as the subtrahend. For this purpose, sum sum and third intermediate value x3 are supplied to a block 28 for difference formation. (When the method is carried out, a difference of setpoint pressure and actual pressure for the various ranges above and below the jump-in point is therefore also weighted using different weighting relations a1 and a2).

Optionally, low-pass filtering, gradient limiting, and/or manipulated variable limiting may also be carried out to establish setpoint differential travel variable Δ. In the method of FIG. 1, difference d2 output from block 28 is initially supplied to a block 30 for low-pass filtering, subsequently as signal d2' to a block 32 for manipulated variable limiting, and as signal d2" to a block 34 for gradient limiting. A switch 36 is situated between blocks 32 and 34, which controls the relay of signal d2" to block 34 as a function of an actuation state S of the brake actuation element (not actuated, displaced, kept constant).

In a final step of the method of FIG. 1, a motor of the electromechanical brake booster is controlled in such a way that a setpoint differential travel, which corresponds to established setpoint differential travel variable Δ, is set between the valve piston and the valve body or the boost body of the electromechanical brake booster. A multitude of control options is usable in this procedure. It will therefore not be discussed in greater detail.

While the method of FIG. 1 is carried out, the brake pressure existing in at least one wheel brake cylinder of the braking system may be varied independently of a position/actuation of the brake actuation element, in particular on the brake master cylinder level. Independently of whether the brake pressure is modulated, the haptic feedback for the driver does not change. A particularly advantageous application option will be described hereafter.

FIGS. 2a through 2f show coordinate systems to explain one specific embodiment of the method for operating a recuperative braking system including an electromechanical brake booster.

Various types of a recuperative braking system equipped with an electromechanical brake booster may also be used for carrying out the method described hereafter. Several braking system components, which are suitable of carrying out specific method steps, are mentioned hereafter. However, it is to be noted that the recuperative braking system used for carrying out the method is not limited to a configuration including precisely these braking system components. The recuperative braking system suitable of carrying out the method is also neither restricted to a specific structure of its brake circuits, nor are there obstructions to an integration of a plurality of further braking system components.

Figure 2A:
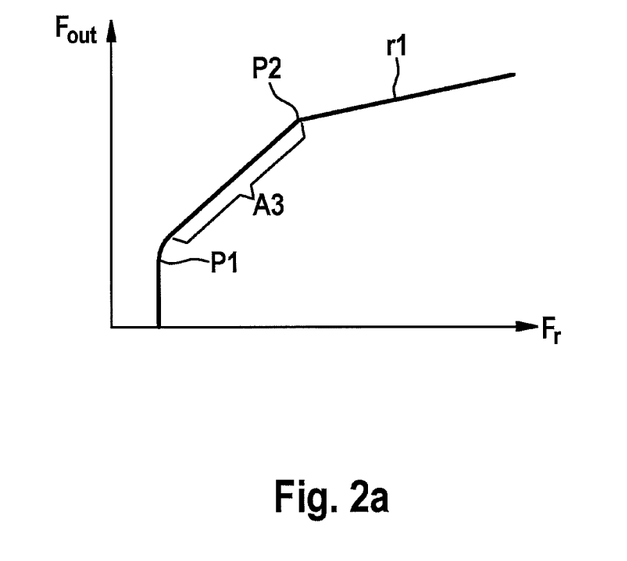
FIGS. 2a through 2f show coordinate systems to explain one specific embodiment of the method for operating a recuperative braking system including an electromechanical brake booster.

FIG. 2a indicates a setpoint relation r1 between a restoring force Fr of a brake actuation element (for example, a brake pedal), which is to be performed as driver brake force of a driver for the driver braking intent specification, and a resulting output force Fout. Output force Fout, which results from the driver brake force and a motor force of a motor of the electromechanical brake booster, is transmitted to at least one displaceable piston of a brake master cylinder of the recuperative braking system and causes a corresponding brake pressure buildup in the brake master cylinder and in at least one wheel brake cylinder, which is connected thereto, of the recuperative braking system. In the coordinate system of FIG. 2a, an abscissa is restoring force Fr and an ordinate is output force Fout.

Figure 2B:
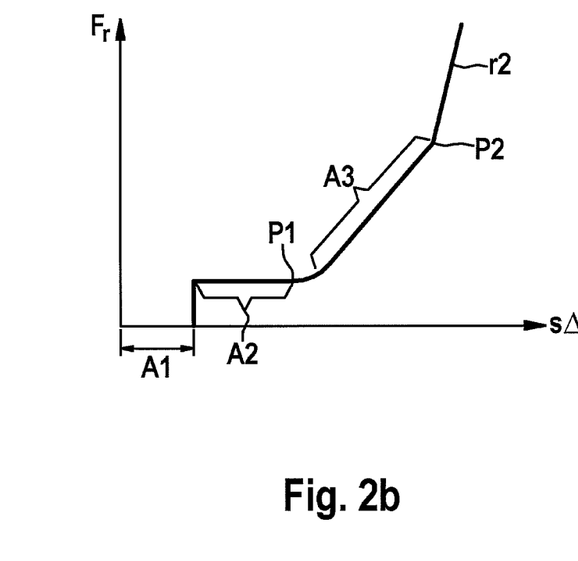
Figure 2C:
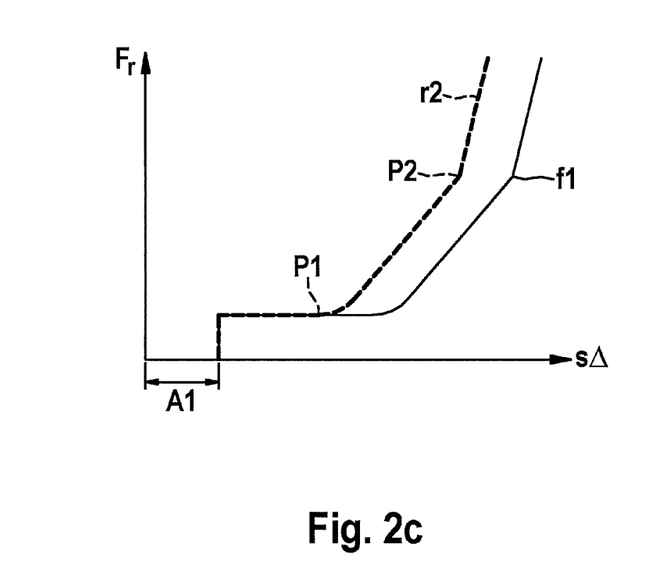

FIG. 2b shows a second setpoint relation r2 between an input rod travel sΔ (as an example of a brake actuation travel) and restoring force Fr, an abscissa indicating input rod travel sΔ and an ordinate indicating restoring force Fr.

Drivers are generally familiar with the fact that after overcoming a free travel range A1 (nearly) without power, an initial actuation of the brake actuation element is possible with the aid of a constant driver brake force (in the event of a uniform restoring force Fr). A jump-in range A2 therefore adjoins free travel range A1, within which a constant restoring force Fr counteracts an increase of input rod travel sΔ. Within jump-in range A2, output force Fout is generally only caused by the motor of the electromechanical brake booster. The electromechanical brake booster is therefore an external force braking system in jump-in range A2 (i.e., the driver brake force does not increase output force Fout). In jump-in range A2, the gap (for example, between the input rod and the reaction disk), which prevents a transmission of the driver brake force in the direction of the brake master cylinder, is still open. With increasing input rod travel sΔ in jump-in range A2, the boost body/valve body is moved in the direction of the brake master cylinder and the reaction disk bulges due to the pressure load on a side oriented toward the input rod.

The gap is first closed at a jump-in point P1, so that during further actuation of the brake actuation element, the driver brake force is transmittable to the at least one displaceable piston of the brake master cylinder to increase the brake pressure. In a linear boost range A3, which adjoins jump-in point P1, a uniform ratio therefore exists between restoring force Fr and output force Fout. Above a control point P2, an increase of the motor power of the motor cannot be added to an increase of the driver brake force, so that any further increase of output force Fout on the at least one displaceable piston has to be provided as a driver brake force. Restoring force Fr therefore increases with a comparatively large slope above control point P2.

The advantageous method for operating the recuperative braking system is described hereafter on the basis of FIGS. 2c through 2f, the abscissas of FIGS. 2c through 2f indicating input rod travel sΔ and the ordinates of FIGS. 2c through 2f indicating restoring force Fr. In all coordinate systems of FIGS. 2c through 2f, second setpoint relation r2 is also plotted, which is to be maintained during a deceleration of the vehicle equipped with the recuperative braking system.

In the method illustrated on the basis of FIGS. 2c through 2f, during the actuation of the brake actuation element of the recuperative braking system, a generator braking torque is used, which is carried out with the aid of a generator of the recuperative braking system. The generator braking torque is established at least while taking into consideration the actuation travel and/or the actuation strength of the actuation of the brake actuation element. Subsequently, the generator is controlled in such a way that a generator braking torque corresponding to the establishment is carried out thereby to decelerate the vehicle. By using the generator, the deceleration of the vehicle may be used for charging a vehicle battery.

However, various factors, for example, a speed of the vehicle and/or a charge state of the vehicle battery may impair the usability of the generator for simultaneously decelerating the vehicle and charging the vehicle battery. This is preferably taken into consideration when establishing the generator braking torque. In addition, it is desirable if the use of the generator for decelerating the vehicle does not result in exceeding the driver braking intent. To ensure this, in the method described here, at least one friction braking torque of the at least one wheel brake cylinder of the recuperative braking system is varied at least while taking into consideration the established generator braking torque in such a way that the driver braking intent is not or is only marginally exceeded. For this purpose, a setpoint variable is established with respect to a brake fluid volume, which is to be displaced with the aid of at least one hydraulic unit of the recuperative braking system between at least one storage volume and a storage-external volume of at least one brake circuit of the recuperative braking system, at least while taking into consideration the established generator braking torque. Subsequently, the at least one hydraulic unit is controlled in such a way that a brake fluid volume corresponding to the setpoint variable is displaced between the at least one storage volume and the storage-external volume.

For example, a volume overlay actuator driven by an electric motor, in particular a plunger, and/or an ESP device capable of volume acceptance and volume discharge, may be used as the at least one hydraulic unit. With the aid of such a hydraulic unit, brake fluid may be aspirated into at least one actuator-intrinsic storage volume, into an external storage volume, and/or into a brake fluid reservoir if needed and expelled again. The volume overlay actuator may be designed either having a self-locking gear mechanism or a gear mechanism having high efficiency.

For example, an increase of the generator braking torque (for example, at the beginning of the actuation of the brake actuation element) may be compensated for by a reduction of the at least one friction braking torque, in that brake fluid is displaced from the storage-external volume into the at least one storage volume. In particular, the volume displaced from the brake master cylinder to the wheel brake cylinders during a slow actuation of the brake actuation element by the driver may be displaced immediately into the at least one storage volume. This causes exemplary relation f1 shown in FIG. 2c, which is describable as a displacement of second setpoint relation r2 in parallel to the abscissa in the direction of increasing input rod travel sΔ.

Figure 2D:
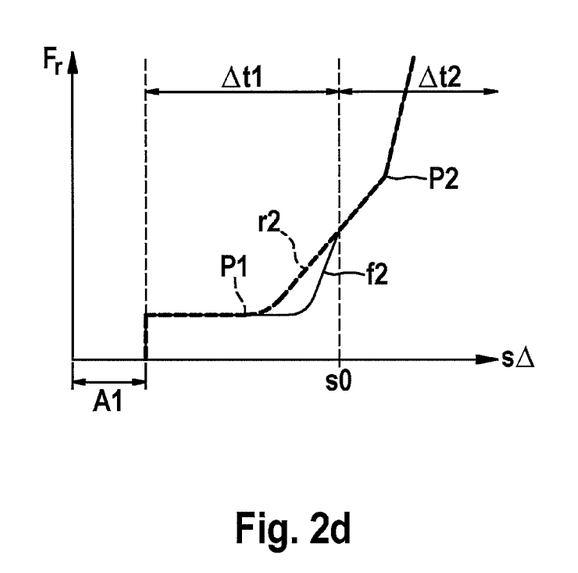
Figure 2E:
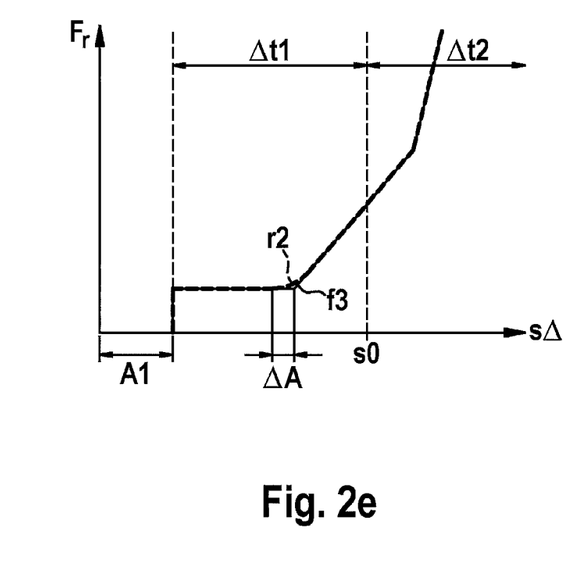

A situation frequently also occurs in which the generator is still deactivated during a brake application and the vehicle is decelerated further merely with the aid of the at least one wheel brake cylinder of the recuperative braking system. In the example of FIG. 2d, from a limiting input rod travel s0, a phase Δt1 of regenerative deceleration of the vehicle is ended and a phase Δt2 of the purely friction brake-based deceleration is started.

As is apparent in FIG. 2d, the chronological decrease of the generator braking torque may be compensated for in that the at least one friction braking torque is increased by displacing the brake fluid volume back out of the at least one storage volume into the storage-external volume. This causes an exemplary relation f2, which, below limiting input rod travel s0, corresponds to exemplary relation f1, and lies at second setpoint relation r2 above limiting input rod travel s0.

With the aid of the above-described method steps of the method for operating an electromechanical brake booster of a braking system, the restoring behavior of the brake actuation element may be adapted still better to second setpoint relation r2, however. In particular, it is to be noted that the above-described method steps are still more advantageous as a single-factor pedal force compensation. In a single-factor pedal force compensation, a compensation factor, which is proportional to the deviation between setpoint value and actual value of the at least one friction braking torque, is calculated for an offset movement of the boost body and subsequently set with the aid of the electromechanical brake booster. However, deviations which are still perceptible to the driver between second setpoint relation r2 and exemplary relation f3, which is implemented with the aid of the single-factor pedal force compensation, occur in the case of the single-factor pedal force compensation, in particular in a range ΔA close to jump-in point P1, as is apparent in FIG. 2e. These deviations may also be referred to as the jump-in errors.

In the method described here, however, instead of a single-factor pedal force compensation, a variation of a restoring force of the brake actuation element is advantageously carried out by operating the electromechanical brake booster according to the procedure of FIG. 1. The method therefore implements at least a two-factor pedal force compensation according to the above-described procedure. In addition to the two-factor pedal force compensation, a multi-factor pedal force compensation may also be carried out.

Figure 2F:
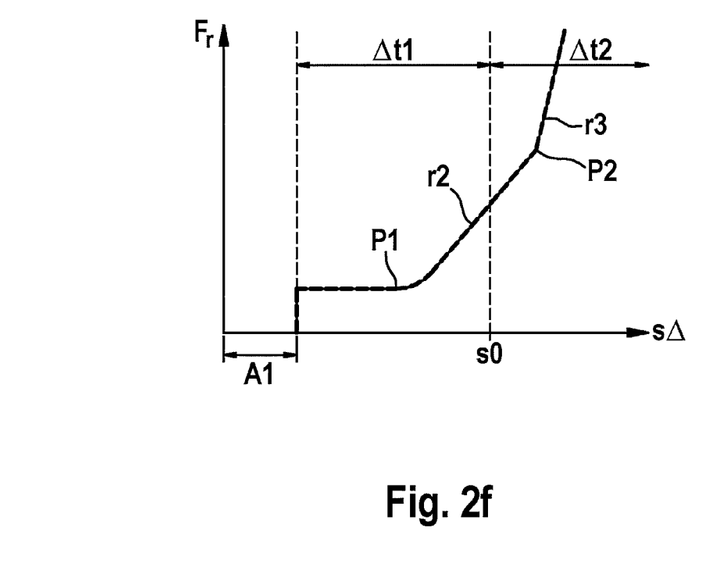

The effect of the at least two-factor pedal force compensation is shown in FIG. 2f, implemented actual relation r3 being located on second setpoint relation r2. By taking into consideration different setting factors for the difference of the setpoint pressures and the actual pressures below a desired jump-in pressure limiting value and above the desired jump-in pressure limiting value, it may be ensured that the gap between compression piece and reaction disk is closed at the correct point. Jump-in point P1 may therefore be established as desired.

As is apparent on the basis of FIG. 2f, a standard pedal feeling is implementable for the driver with the aid of the method described here in spite of the changes of the generator braking torque during deceleration. In this way, it is possible to prevent the chronological changes of the at least one friction braking torque from causing perceptible changes for the driver of the restoring behavior of the brake actuation element. In addition, the occurrence of undesirable movements at the foot of the driver is suppressed, whereby undesirable changes on the driver braking intent are also prevented.

Also, during an application of the method, no changes in the brake actuating feeling/the haptic feedback (braking characteristic) occur even in the event of a change between purely-hydraulic braking (merely with the aid of the wheel brake cylinders) and braking while using the generator.

In particular, a pedal force/actuation travel curve does not change during an overlay of the generator braking torque. This advantage is ensured although the driver, during the actuation of the brake actuation element, is coupled to the brake master cylinder as soon as the gap is closed and the brake booster becomes the servo brake from the external power brake. The shape of the jump-in point transition in the pedal force/actuation travel curve may be influenced in a simple way and reliably with the aid of software parameterization.

The above-described methods may also be carried out by a control device for at least one electromechanical brake booster. An electromechanical brake booster for a braking system including such a control device, and a braking system for a vehicle including a corresponding control device and/or a corresponding electromechanical brake booster also ensure the above-described advantages.

What is claimed is:

1. A method for operating an electromechanical brake booster of a braking system, comprising:
    establishing a virtual setpoint brake pressure variable at least while taking into consideration at least one of an actuation travel, and an actuation strength, of an actuation of a brake actuation element of the braking system;
    establishing a setpoint differential travel variable with respect to a setpoint differential travel to be set between a valve piston and a valve body of the electromechanical brake booster at least by:
        establishing a first intermediate value while taking into consideration a first weighting relation and a minimum from a first value set including the virtual setpoint brake pressure variable and a jump-in pressure variable, which corresponds to a virtual setpoint brake pressure variable, from which a gap, which is present when the brake actuation element is not actuated, is closed, and
        establishing a second intermediate value while taking into consideration a second weighting relation and a maximum from a second value set including zero and a value of a difference having the virtual setpoint brake pressure variable as a minuend and the jump-in pressure variable as a subtrahend,
        wherein the setpoint differential travel variable is established at least while taking into consideration a sum of the first intermediate value and the second intermediate value; and
    controlling a motor of the electromechanical brake booster in such a way that a differential travel, which corresponds to the established setpoint differential travel variable, is set between the valve piston and the valve body of the electromechanical brake booster.

2. The method as recited in claim 1, wherein the setpoint differential travel variable is established while additionally taking into consideration a quotient of a brake master cylinder pressure variable with respect to a brake master cylinder pressure which exists or is to be set in a brake master cylinder of the braking system as a dividend and the virtual setpoint brake pressure variable as a divisor.

3. The method as recited in claim 2, wherein, to establish the setpoint differential travel variable, a third intermediate value as a product of a sum of the first intermediate value and the second intermediate value and a quotient of the brake master cylinder pressure variable as a dividend and the virtual setpoint brake pressure variable as a divisor is established and also taken into consideration.

4. The method as recited in claim 3, wherein the setpoint differential travel variable is established while taking into consideration a value of a difference with the sum of the first intermediate value and the second intermediate value as a minuend and the third intermediate value as a subtrahend.

5. The method as recited in claim 1, wherein low-pass filtering is carried out to establish the setpoint differential travel variable.

6. The method as recited in claim 1, wherein gradient limiting is carried out to establish the setpoint differential travel variable.

7. The method as recited in claim 1, wherein manipulated variable limiting is carried out to establish the setpoint differential travel variable.

8. A method for operating a recuperative braking system including an electromechanical brake booster comprising:
    carrying out at least the following steps during the actuation of the brake actuation element of the recuperative braking system:
        establishing a generator braking torque, which is carried out with the aid of a generator of the recuperative braking system, at least while taking into consideration at least one of an actuation travel, and an actuation strength, of the actuation of the brake actuation element and controlling the generator accordingly;
        varying at least one friction braking torque of at least one wheel brake cylinder of the recuperative braking system at least while taking into consideration the established generator braking torque by establishing a setpoint variable with respect to a brake fluid volume, which is to be displaced with the aid of at least one hydraulic unit of the braking system between at least one storage volume and a storage-external volume of at least one brake circuit of the recuperative braking system at least while taking into consideration the established generator braking torque, and controlling the at least one hydraulic unit accordingly; and
        varying a restoring force of the brake actuation element by operating the electromechanical brake booster by:
            establishing a virtual setpoint brake pressure variable at least while taking into consideration at least one of an actuation travel, and an actuation strength, of an actuation of a brake actuation element of the braking system;
            establishing a setpoint differential travel variable with respect to a setpoint differential travel to be set between a valve piston and a valve body of the electromechanical brake booster at least by:
                establishing a first intermediate value while taking into consideration a first weighting relation and a minimum from a first value set including the virtual setpoint brake pressure variable and a jump-in pressure variable, which corresponds to a virtual setpoint brake pressure variable, from which a gap, which is present when the brake actuation element is not actuated, is closed, and establishing a second intermediate value 'while taking into consideration a second weighting relation and a maximum from a second value set including zero and a value of a difference having the virtual setpoint brake pressure variable as a minuend and the jump-in pressure variable as a subtrahend, wherein the setpoint differential travel variable is established at least while taking into consideration a sum of the first intermediate value and the second intermediate value; and controlling a motor of the electromechanical brake booster in such a way that a differential travel, which corresponds to the established setpoint differential travel variable, is set between the valve piston and the valve body of the electromechanical brake booster.

9. A control device for at least one electromechanical brake booster of a braking system, wherein the control device is designed to establish a virtual setpoint brake pressure variable at least while taking into consideration at least one of an actuation travel and an actuation strength, of an actuation of a brake actuation element of the braking system, and the control device is additionally designed to establish a setpoint differential travel variable with respect to a setpoint differential travel to be set between a valve piston and a valve body of the electromechanical brake booster, at least in that a first intermediate value is established while taking into consideration a first weighting relation and a minimum from a first value set including the virtual setpoint brake pressure variable and a jump-in pressure variable, which corresponds to a virtual setpoint brake pressure variable, from which a gap, which is present when the brake actuation element is not actuated, is closed, and a second intermediate value is established while taking into consideration a second weighting relation and a maximum from a second value set including zero and a value of a difference using the virtual setpoint brake pressure variable as a minuend and the jump-in pressure variable as a subtrahend, the setpoint differential travel variable being established at least while taking into consideration a sum of the first intermediate value and the second intermediate value, and the control device is designed to control a motor of the electromechanical brake booster in such a way that a differential travel corresponding to the established setpoint differential travel variable is settable between the valve piston and the valve body of the electromechanical brake booster.

10. The control device as recited in claim 9, wherein the control device is additionally designed to establish a generator braking torque, which is carried out with the aid of a generator of the braking system, at least while taking into consideration the at least one of the actuation travel and the actuation strength, of the actuation of the brake actuation element and to control the generator accordingly, and, at least while taking into consideration the established generator braking torque, to establish a setpoint variable with respect to a brake fluid volume to be displaced with the aid of at least one hydraulic unit of the braking system between at least one storage volume and a storage-external volume of at least one brake circuit of the braking system and to control the at least one hydraulic unit accordingly.

11. An electromechanical brake booster for a braking system including a control device, the control device being designed to establish a virtual setpoint brake pressure variable at least while taking into consideration at least one of an actuation travel and an actuation strength, of an actuation of a brake actuation element of the braking system, and the control device is additionally designed to establish a setpoint differential travel variable with respect to a setpoint differential travel to be set between a valve piston and a valve body of the electromechanical brake booster, at least in that a first intermediate value is established while taking into consideration a first weighting relation and a minimum from a first value set including the virtual setpoint brake pressure variable and a jump-in pressure variable, which corresponds to a virtual setpoint brake pressure variable, from which a gap, which is present when the brake actuation element is not actuated, is closed, and a second intermediate value is established while taking into consideration a second weighting relation and a maximum from a second value set including zero and a value of a difference using the virtual setpoint brake pressure variable as a minuend and the jump-in pressure variable as a subtrahend, the setpoint differential travel variable being established at least while taking into consideration a sum of the first intermediate value and the second intermediate value, and the control device is designed to control a motor of the electromechanical brake booster in such a way that a differential travel corresponding to the established setpoint differential travel variable is settable between the valve piston and the valve body of the electromechanical brake booster.

12. A braking system for a vehicle including a control device, the control device being designed to establish a virtual setpoint brake pressure variable at least while taking into consideration at least one of an actuation travel and an actuation strength, of an actuation of a brake actuation element of the braking system, and the control device is additionally designed to establish a setpoint differential travel variable with respect to a setpoint differential travel to be set between a valve piston and a valve body of an electromechanical brake booster, at least in that a first intermediate value is established while taking into consideration a first weighting relation and a minimum from a first value set including the virtual setpoint brake pressure variable and a jump-in pressure variable, which corresponds to a virtual setpoint brake pressure variable, from which a gap, which is present when the brake actuation element is not actuated, is closed, and a second intermediate value is established while taking into consideration a second weighting relation and a maximum from a second value set including zero and a value of a difference using the virtual setpoint brake pressure variable as a minuend and the jump-in pressure variable as a subtrahend, the setpoint differential travel variable is established at least while taking into consideration a sum of the first intermediate value and the second intermediate value, and the control device is designed to control a motor of the electromechanical brake booster in such a way that a differential travel corresponding to the established setpoint differential travel variable being settable between the valve piston and the valve body of the electromechanical brake booster.

* * * * *